United States Patent
Volkmer et al.

(10) Patent No.: US 8,075,658 B2
(45) Date of Patent: Dec. 13, 2011

(54) FILTER ELEMENT

(75) Inventors: Daniel Volkmer, Dingolfing (DE); Fritz Brenneis, Marklkofen (DE); Maximilian Graf, Marklkofen (DE); Markus Weindl, Steinberg (DE)

(73) Assignee: Mann + Hummel GmbH, Ludwigsburg (DE)

( * ) Notice: Subject to any disclaimer, the term of this patent is extended or adjusted under 35 U.S.C. 154(b) by 308 days.

(21) Appl. No.: 12/057,417

(22) Filed: Mar. 28, 2008

(65) Prior Publication Data

US 2008/0236121 A1   Oct. 2, 2008

(30) Foreign Application Priority Data

Mar. 30, 2007 (DE) .................. 20 2007 004 794 U

(51) Int. Cl.
   *B01D 46/00* (2006.01)
(52) U.S. Cl. ............ 55/497; 55/502; 55/511; 55/521; 55/DIG. 31
(58) Field of Classification Search .......... 55/497, 55/502, 511, 521, DIG. 31
   See application file for complete search history.

(56) References Cited

U.S. PATENT DOCUMENTS

| | | | |
|---|---|---|---|
| 6,126,707 A * | 10/2000 | Pitzen | 55/495 |
| 6,454,826 B2 * | 9/2002 | Fath et al. | 55/490 |
| 6,758,878 B2 * | 7/2004 | Choi et al. | 55/497 |
| 2007/0289274 A1 * | 12/2007 | Justice et al. | 55/511 |
| 2008/0120953 A1 * | 5/2008 | Volkmer et al. | 55/493 |

FOREIGN PATENT DOCUMENTS

| | | |
|---|---|---|
| DE | 19512678 C1 | 11/1996 |
| DE | 10231696 A1 | 1/2004 |
| DE | 10241748 A1 | 3/2004 |
| DE | 10324681 A1 | 12/2004 |
| EP | 1134014 A1 | 9/2001 |

OTHER PUBLICATIONS

Machine translation of the description of DE 195 12 678, published Nov. 21, 1996.*
Machine translation of the description of DE 102 31 696, published Jan. 22, 2004.*
EP search in related patent application, dated Oct. 15, 2009.

* cited by examiner

*Primary Examiner* — Robert Clemente
(74) *Attorney, Agent, or Firm* — James Hasselbeck

(57) ABSTRACT

A filter element has a zigzag-shaped fold pack of folds. At least one terminal element is folded parallel to the folds of the fold pack. The at least one terminal element has a first leg, a second leg, and a third leg. The first leg is arranged substantially perpendicularly to a flow direction of a medium flowing through the filter element. The first, second and third legs are delimited by folds of the at least one terminal element. The first and second legs are positioned substantially at a right angle relative to one another. The third leg projects laterally away from the filter element to form a peripheral seal.

16 Claims, 4 Drawing Sheets

FILTER ELEMENT

BACKGROUND OF THE INVENTION

The invention relates to a filter element, in particular, an interior filter for filtering air for the interior of a motor vehicle.

Such a filter element serves for filtering fluid flows or gaseous media, for example, for filtering an air flow that is supplied to the interior of a motor vehicle. Even though the present invention can be used in connection with any filter element, the present invention as well as the problems to be solved by it will be explained in the following in connection with a filter element for filtering air for the interior of a motor vehicle. Such filters are referred to in the following as motor vehicle interior air filters or interior filters as well as cabin air filters.

In view of the increasing air pollution, in particular in metropolitan areas, in connection with the use of modern air conditioning devices, it is desirable and also necessary to purify by suitable filters the air that is supplied from the exterior to the interior of a motor vehicle and, in the process, conditioned or air-conditioned. For example, particle filters or odor-eliminating filters or their combinations are suitable for this purpose; the filters should remove or absorb as much as possible of suspended solids, particles and odors contained in the ambient air. Such filters for filtering air for the interior of a motor vehicle are generally known in a plurality of embodiments and variants so that their configuration and function will be explained only briefly in the following.

Since the efficiency of filters depends in particular on the size of the surface area of the filter through which the air passes, zigzag-shaped folded filter media, also referred to as pleated filter media, are utilized primarily in the case of motor vehicle interior air filters. By means of folding of the employed filter medium and depending on the fold height, the fold spacing, and the degree of compression of this accordion-like filter pack of the different fold sections of the filter medium, an enlargement of the filter surface area through which the air flow passes can be achieved. In order to be able to handle such filter elements with zigzag-shaped folded filter media better, in particular during mounting, frequently reinforcement elements are provided on the sides of the filter element along the filter pack of folded medium. These reinforcement elements serve for lateral fixation and stabilization of the zigzag-shaped filter medium and are usually attached by means of a suitable adhesive to the lateral edges of the fold pack. In this way, the filter element with strip-shaped reinforcements provided on the folded longitudinal sides can be inserted in a simple way without damaging it into a housing of a filter assembly or a matching filter receptacle, for example, a filter housing or an air conditioning device of a motor vehicle.

Filter elements of this kind are disclosed e.g. in German patent applications DE 102 31 696 A1 and DE 102 41 748 A1.

In addition to the requirement of stability, the filter elements for filter inserts must also seal-tightly connect to the edge areas of the corresponding housings so that the air to be filtered flows substantially completely through the filter medium or the fold pack and does not flow past it.

It is moreover desirable that these filter elements, in addition to a simple mounting-technological handling, should also be inexpensively and therefore should be producible with regard to manufacturing technology in a way that is as simple as possible. In this connection, it is also desirable that as little as possible of the filter material, e.g. non-woven filter material, is required.

Given this background, the present invention has the object to provide an improved filter element that has, in particular in the edge areas, a sufficient stability as well as a seal-tight connection to the filter housing.

SUMMARY OF THE INVENTION

In accordance with the present invention, this is achieved in that the filter element, provided in particular for filtering air or for absorption of gaseous pollutants in the air for the interior or the cabin of a motor vehicle, which filter element comprises a zigzag-shaped folded fold pack and at least one terminal element that is folded parallel to the folds of the fold pack. The terminal element has a first leg, a second leg, and a third leg wherein the first leg extends substantially perpendicularly to a flow direction of a medium passing through the filter element. The first, second, and third legs are delimited relative to one another by folds of the terminal element.

According to the invention, lateral stability, for example, of the end face of the filter element, is achieved by two folded edges or two folds of the terminal element wherein in addition a special seal-tightness is achieved by means of the second and/or third legs that generally project laterally. The first and the second legs preferably are positioned at a right angle relative to one another. In this case, the fold between the first and the second legs can form at the same time the lateral end of the fold pack; the third leg then projects laterally from the filter element for sealing purposes.

Moreover, a lateral web can be provided on the filter element which is integrally attached to ends of several transversely cut folds of the fold pack. While the terminal element closes off a side of the filter element that extends essentially parallel to the folds of the fold pack, the lateral web delimits sides of the filter element that extend at a non-vanishing angle to the folds of the fold pack. It is conceivable to provide the filter element with a square, rectangular or polygonal foot print, for example; the terms foot print or contour are to be understood as a surface area perpendicular to the flow direction of a medium to be filtered. Passage of the air to be filtered through the filter can be, for example, in a direction perpendicular to the folds of the fold pack and at an acute angle to the fold sections of the fold pack when the filter is arranged perpendicularly to the flow of air. In principle, the air to be filtered can pass through the folds of the fold pack at an angle or angles that are different from those described above, depending on how the filter is arranged in the flow. In principle, the filter element according to the invention does not predetermine a preferred direction for the flow.

Preferably, the lateral web is manufactured of a material that is of the same thickness or thicker than the terminal element. In one embodiment, the first leg of the terminal element is positioned e.g. on an edge of the lateral web. In this case, the lateral web and the first leg of the terminal element provide a stable frame extending about the fold pack of the filter element.

In a further embodiment, the first leg of the terminal element is resting on a folded edge of the fold pack. In this way, the first leg of the terminal element that is e.g. glued to the folded edge imparts an increased stability by means of its fold providing the transition to the second terminal element.

In an alternative embodiment of the filter element, a fold end section of the fold pack is glued to the second leg of the terminal element. In this case, the third leg of the terminal element projects laterally from the filter element and the first leg is positioned substantially parallel to the cross-section, i.e., perpendicularly to the flow direction of the medium to be purified by means of the filter element or the fold pack.

It is also conceivable that a fold end section of the fold pack is positioned relative to the second leg of the terminal element at a non-vanishing angle, i.e., at an angle that is not zero degrees. A terminal edge of the fold end section can be, for example, glued into the fold between the first leg and the second leg of the terminal element so that a particularly stable fold is provided that furthermore is provided with additional stability by means of the fold between the third and the second legs.

In another alternative embodiment of the filter element, a shortened fold end section is glued to the second leg of the terminal element. In this case, for example, a terminal fold of the fold pack can be inserted into the inner fold edge of the fold between the first and the second legs.

In a preferred embodiment of the filter element the filter element is comprised exclusively of the fold pack, two lateral webs, and two terminal elements that are connected to one another in a suitable way, for example, by gluing. This preferred embodiment has a sufficient stability and enables building of a filter element with minimal material expenditure.

In a further possible embodiment, for example, at least one further leg adjoining the third leg of the terminal element is provided. The terminal element can be of a unitary construction wherein, for example, the legs are formed by slotted folds of the terminal element material. In a preferred embodiment the width of the second leg corresponds to the height of the filter element. In a further embodiment, the sum of the width of the second leg and the width of the third leg can match the height of the filter element or can be preferably greater than said height.

Further advantageous configurations and modifications are disclosed in the dependent claims as well as in the embodiments described in the following.

DESCRIPTION OF THE PREFERRED EMBODIMENTS

Figure 1:
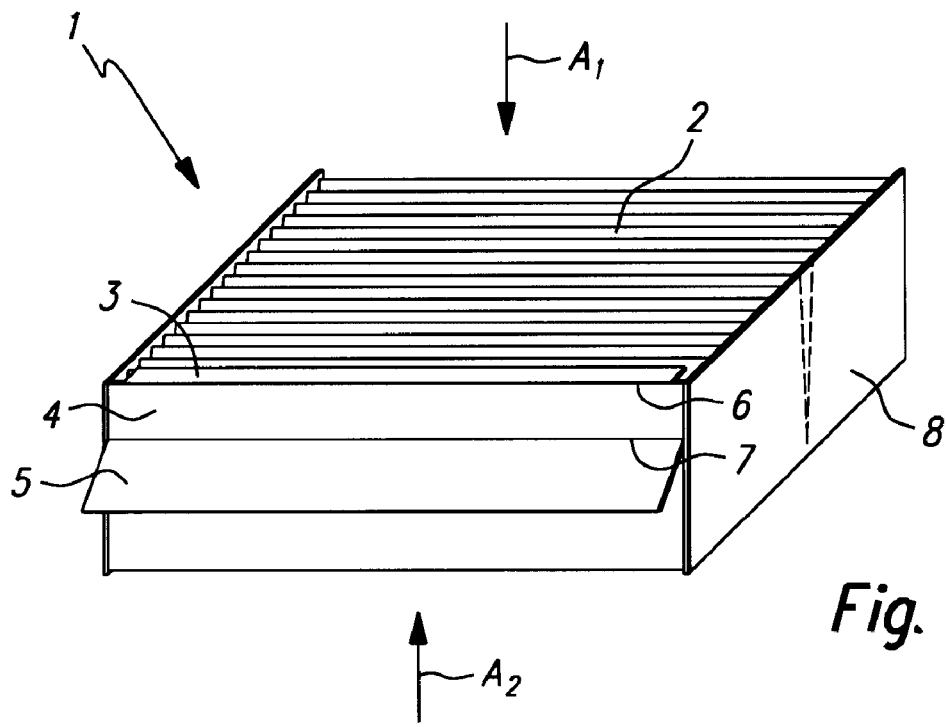
FIG. 1 is a perspective view of a first embodiment of the filter element according to the invention.

In the drawings, same, or functionally identical, elements and features are identified by same reference numerals, if not noted otherwise.

In FIG. 1 a perspective illustration of a first embodiment of a filter element according to the invention is shown. As an example, the filter element 1 is shown with a rectangular contour. The fold pack 2 is comprised of a zigzag-shaped folded filter medium, for example, a non-woven filter material or filter paper of cellulose, that is permeable for a fluid or gaseous medium and can be, for example, covered with active carbon. The material thickness can be preferably in a range of 0.5 mm to 2 mm. In certain situations and for special applications, a material thickness deviating from the above range is conceivable. It is also possible to employ a polyester material as a non-woven filter material.

On the sides or end faces of the filter element 1 that extend parallel to the folds of the fold pack 2 (in the illustration of FIG. 1 on the side facing the viewer), a terminal element 3, 4, 5 is provided that has three legs that are delimited relative to one another by folds 6, 7. A first leg is positioned transversely to the flow direction of the medium to be filtered, for example, air, the flow direction being indicated by arrow A1 and A2. In the illustration of FIG. 1, a flow direction A1 in the downward direction and a flow direction A2 in the upward direction are possible for the fold pack 2.

A fold 6 delimits the first leg 3 from the second leg 4 of the terminal element and a second fold 7 separates the second leg 4 from the third leg 5. The third leg 5 projects laterally from the filter element and provides a seal-tight connection relative to a housing wall in the mounted state of the filter element 1. It is then possible that air flowing in the flow direction A2 flows onto the lateral tab formed by the third leg 5 and forces the third leg 5 father outwardly.

Lateral webs 8 delimit the filter element 1 in a direction perpendicular to the folds of the fold pack. In this way, the fold pack (referred to also as an accordion pack or bellows) is surrounded by a frame comprised of the lateral webs 8 and an L-shaped angle piece of the first leg 3 and the second leg 4 of the terminal element, respectively. Already the first fold 6 provides a certain stability to this frame. By means of the second fold 7 between the second leg 4 and the third leg 5 the stability is further improved. This can also be considered as a reinforcement of the fold pack or filter element by the lateral webs 8 and the terminal elements 3, 4, 5. In addition to this particularly stable frame, by means of the laterally projecting third leg 5 an excellent peripheral contact and thus a peripheral sealing action in the mounted state of the filter element 1 are provided, i.e., leg 5 provides a peripheral seal.

By means of the bend or the folds 6, 7 that are configured, for example, by slotted or scored or embossed bends in the material of the terminal element, the width of the first leg 3 can be selected to be particularly minimal; this leads to an improved flow cross-section of the filter element. Usually, several folded edges of the fold pack must be covered by a glued-on leg in order to provide a satisfactory stability. According to the invention the sealing action of the lateral tab formed by the third leg 5 and the stabilizing properties of the folds 6, 7 are combined in order to provide a filter element 1 that can be produced particularly inexpensively.

The embodiment according to the invention for a filter element 1 has thus a particularly low material consumption and is producible in a simple way because it is comprised in the parallelepipedal shape of FIG. 1 only of two lateral webs 8, the fold pack 2, as well as two terminal elements 3, 4, 5. The connections between these elements can be realized simply by a suitable adhesive connection (gluing). In this connection, the adhesive in the cured or hardened state can impart additional stability to the non-woven material.

Figure 2:
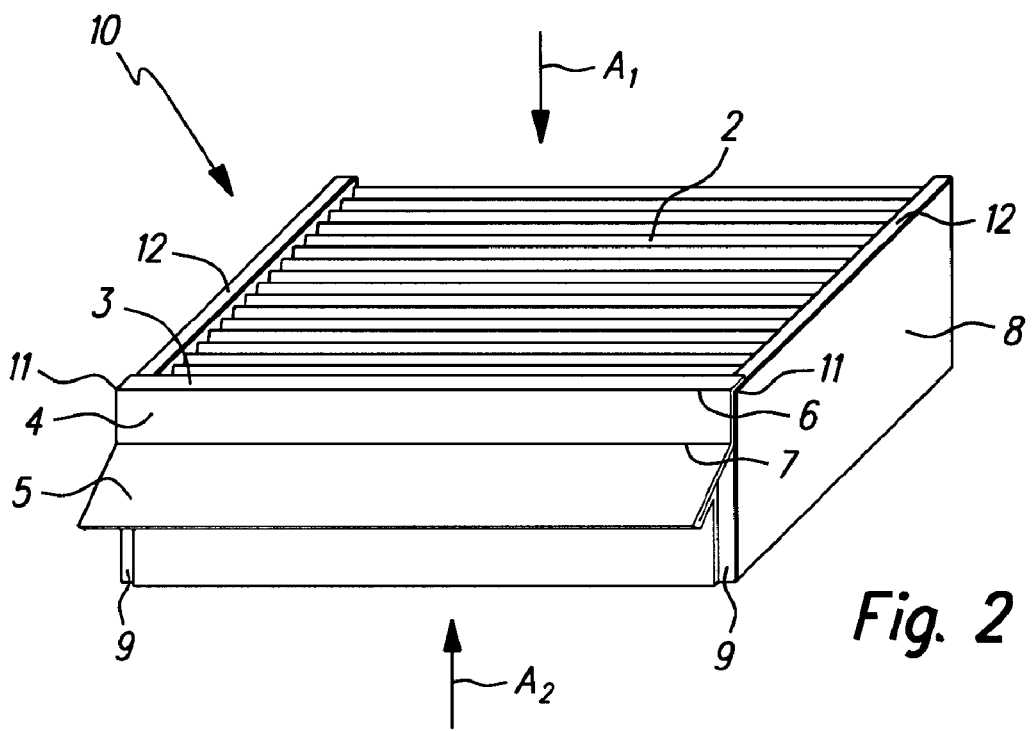
FIG. 2 is a perspective view of a second embodiment of the filter element according to the invention.

In FIG. 2 a perspective view of a second embodiment of a filter element according to the invention is illustrated. The second embodiment 10 is substantially comprised of the same elements as the embodiment of FIG. 1.

In the filter element 10 of FIG. 2, the lateral webs 8 are made of a material having the same thickness or a greater thickness than the terminal elements 3, 4, 5 and the folded material of the fold pack 2. A lateral web 8 thus has edges 9, 12 to which the terminal element can be glued at the corners 11 of the filter element 10. Accordingly, for example the first leg 3 is resting on the upper edge 12 of the lateral web 8 and is glued thereto. The ends of the second leg 4 are glued to the edges 9 of the lateral webs 8 facing the viewer. In this embodiment of the filter element 10 on the corners 11 a special stability is provided by the adhesive connection and the folds 6, 7.

In the following Figures, possible modifications of the terminal areas of the filter element according to the invention are shown in cross-section and explained in more detail. In this connection, the following Figures illustrate section views taken perpendicularly to the folds of the fold pack.

Figure 3:
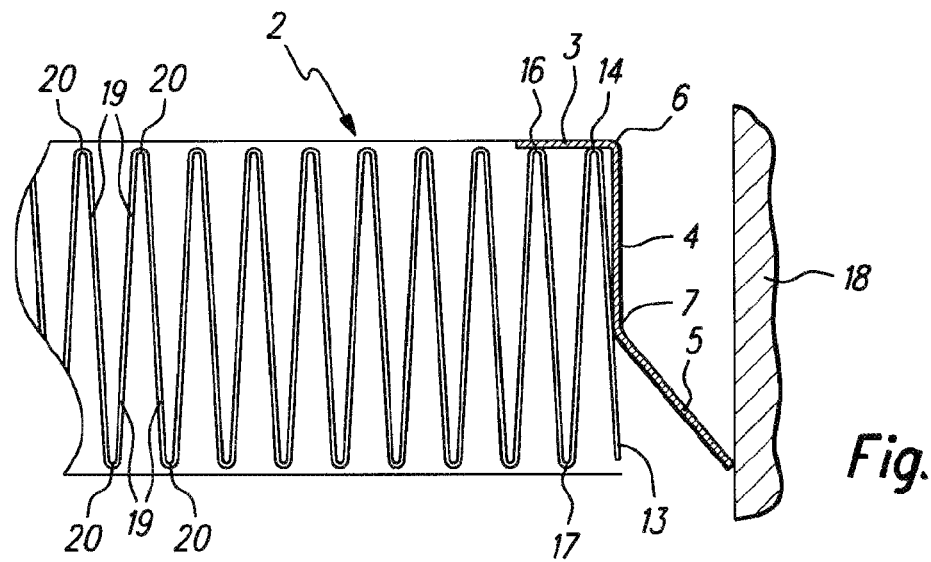
FIG. 3 is a detail view of a fold cross-section of the filter element showing a first variant of the terminal element.

In FIG. 3, the fold pack 2 is schematically illustrated. The fold pack 2 is formed, for example, by fold sections 19 and folded edges 20. The bellows ends on the one hand with a cut surface through the fold pack and on the other hand with a fold end section 13 that adjoins the terminal fold 14 of the fold pack 2. A lateral web, as shown e.g. in FIG. 1 and FIG. 2, can be glued onto the cut surface (ends of the cut folds).

In FIG. 3 the first leg 3 of the terminal element is placed onto two folded edges 14, 16 of the end of the fold pack 2. At the contact points an adhesive connection can be provided, for example. Moreover, the second leg 4, starting at the first leg 3, extends by means of fold 6 substantially at a right to the first leg 3.

By means of the fold 7 a third leg 5 of the terminal element is formed and extends away from the second leg 4. Moreover, a part of the housing 18 in which the filter element is mounted is illustrated also. The third leg 5 projects laterally away from the filter element and rests against the filter housing 18. In this way, by means of the third leg 5 a sealing action between the filter element and the housing 18 is provided. Moreover, the illustrated peripheral area of the filter element is on the one hand stabilized by the first leg 3 resting on the folded edges 14, 16 of the fold pack 2 as well as the two folds 6, 7 of the terminal element.

In FIG. 3 the third leg 5 projects with its width past the fold pack 2, i.e., in the state of the legs 4 and 5 resting against the fold end section 13, the third leg 5 projects downwardly past the fold pack as illustrated in FIG. 3.

Figure 4:
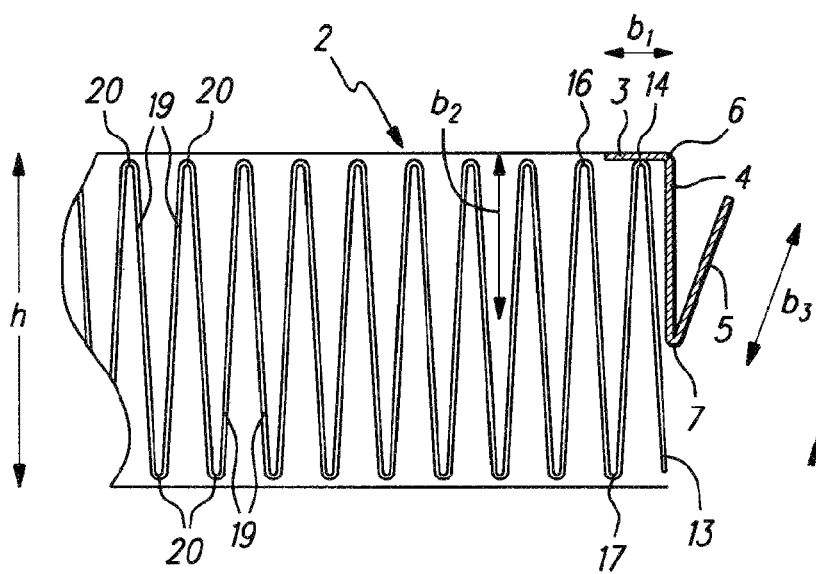
FIG. 4 is a detail view of a fold cross-section of the filter element showing a second variant of the terminal element.

FIG. 4 shows a second embodiment for configuring the terminal element according to the invention. The first leg 3 is attached only to one terminal folded edge 14 of the fold pack 2 on the topside. The fold end section 13 is essentially exposed but is provided with stability by means of an adhesive connection, not illustrated in FIG. 4, to the lateral web, as disclosed in FIGS. 1 and 2.

In FIG. 4 a situation is illustrated in which the second and third legs 4, 5 of the terminal element are positioned at an acute angle relative to one another. In this way, an increased force is achieved by the restoring force of the fold 7 in the horizontal direction, i.e., perpendicularly away from the folds of the fold pack 2 in the direction of a housing wall (not illustrated, but compare FIG. 3).

The size ratios of the height h of the filter element that is defined by the width of the fold section 19 and the folding angle of the fold edges 20 relative to the widths b1, b2, b3 of the legs 3, 4, 5 of the terminal element are selected in the example of FIG. 4 in such a way that the sum of the width b2 of the second leg 4 and the width b3 of the third leg 5 matches the height h of the filter element. The terminal element requires only a minimal material expenditure because with the two folds 6, 7 or fold edges a high stability can be achieved and only one terminal fold 14 of the fold pack must be covered.

Figure 5:
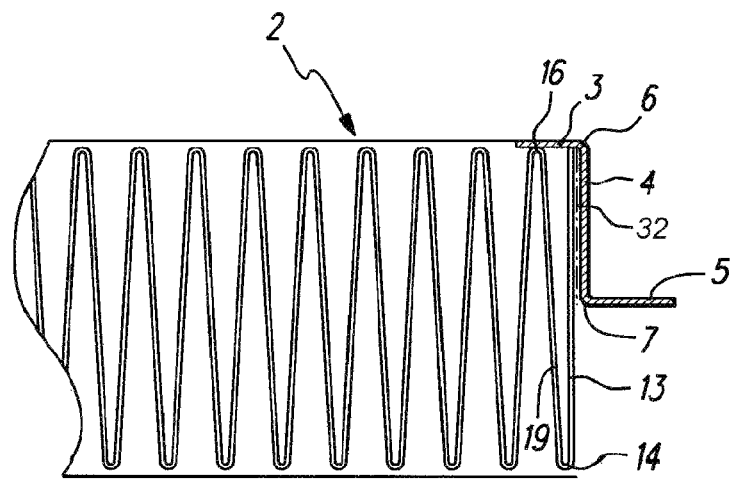
FIG. 5 is a detail view of a fold cross-section of the filter element showing a third variant of the terminal element.

In FIG. 5 a further possible realization of the filter element according to the invention is illustrated. The fold end section 13 is connected by means of an adhesive connection 32 to the second leg 4 and the first leg 3 is resting on the last upper terminal fold edge 16 of the fold pack 2. The fold end section 13 and the second leg 4 extend parallel and rest tightly against one another so that they form with the first leg 3 a right angle. By means of the adhesive connection 32 an additional stiffness of the peripheral area illustrated in FIG. 5 is achieved and the stiffness is moreover reinforced by the folds 6, 7. By means of the legs 3, 4 and the fold end section 13 as well as the second to last fold section 19 a stable three-sided structure is provided.

Figure 6:
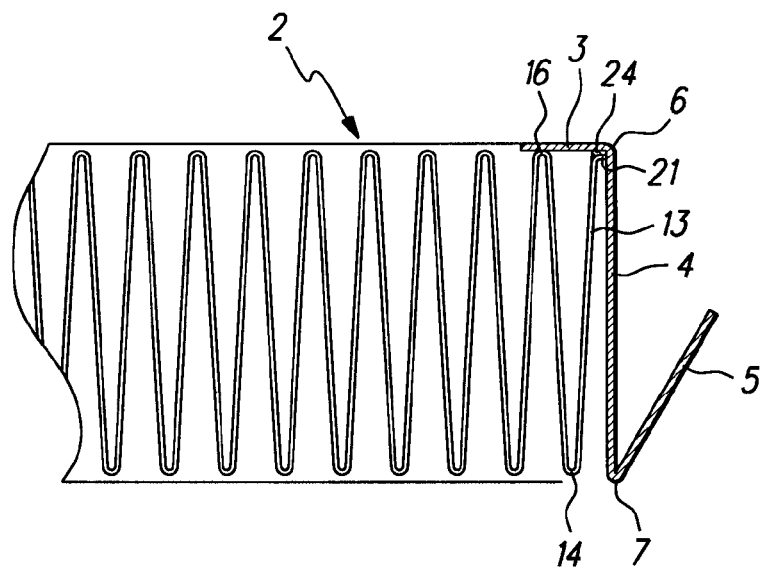
FIG. 6 is a detail view of a fold cross-section of the filter element showing a fourth variant of the terminal element.

In FIG. 6 an alternative embodiment is illustrated. A terminal edge 21 of the fold end section 13 is glued by means of an adhesive connection 24 to the corner formed between the first and the second legs 3, 4. The contact surface of the first leg 3 is provided by the terminal edge 21 as well as the adhesive connection 24 and the second to last folded edge 16 of the fold pack. The second leg 4 extends across the entire height of the fold pack 2 or filter element. The third leg 5 projects laterally from the filter element wherein the fold 7 forms the lower end of the second leg 4 and thus of the filter element. The edges 14, 16, 6, and 21 provide a stable profile.

Figure 7:
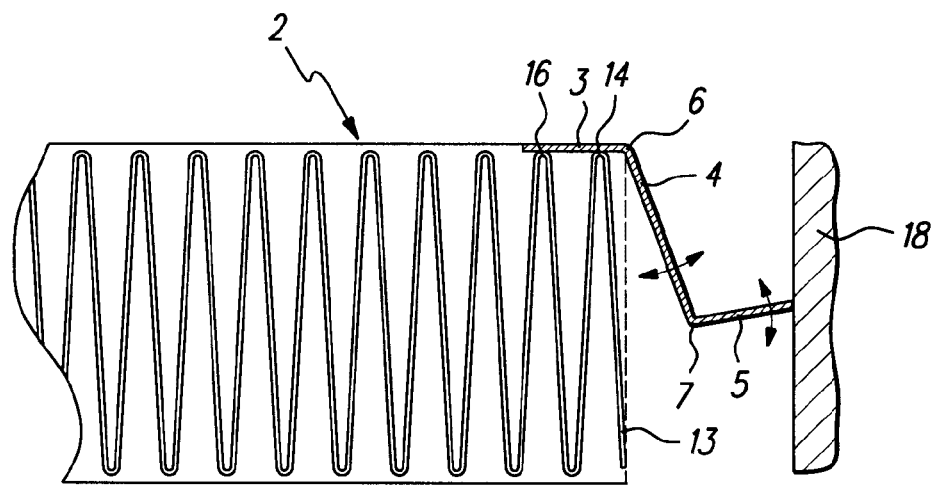
FIG. 7 is a detail view of a fold cross-section of the filter element showing a fifth variant of the terminal element.

In FIG. 7 a further modification of the filter element according to the invention is illustrated. The first leg 3 is arranged on two folded edges 14, 16 of the fold pack 2, for example, glued thereto; the second leg 4 as well as the third leg 5 project laterally from the filter element. The movability of the second and third legs 4, 5 by means of the folds 6, 7 is illustrated by arrows. A sealing action in the direction toward a filter housing wall 18 is realized by compression of the folds 6, 7 of the terminal element.

Figure 8:
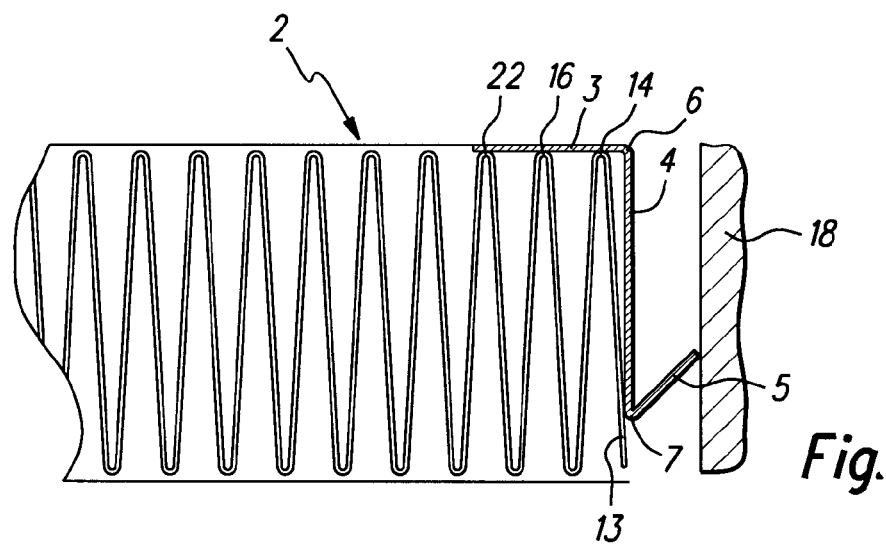
FIG. 8 is a detail view of a fold cross-section of the filter element showing a sixth variant of the terminal element.

In FIG. 8 a further possible modification of the terminal element is illustrated. The first leg 3 covers three folds, i.e., rests on three fold edges 14, 16, 22 of the fold pack 2. Moreover, the fold end section 13 and the second leg 4 are positioned at an extremely acute angle relative to one another. The third leg 5 is bent upwardly so that by means of the fold 7 between the second and the third legs 4 and 5 an especially high tension is generated that causes a restoring force in the direction toward the housing wall 18. By covering several folded edges 14, 16, 22 of the fold pack 2 with the first leg or resting the first leg 3 on several folded edges 14, 16, 22, the stability of the peripheral areas of the filter element is increased and the filter element moreover experiences increased stiffness by means of the folds 6, 7.

Figure 9:
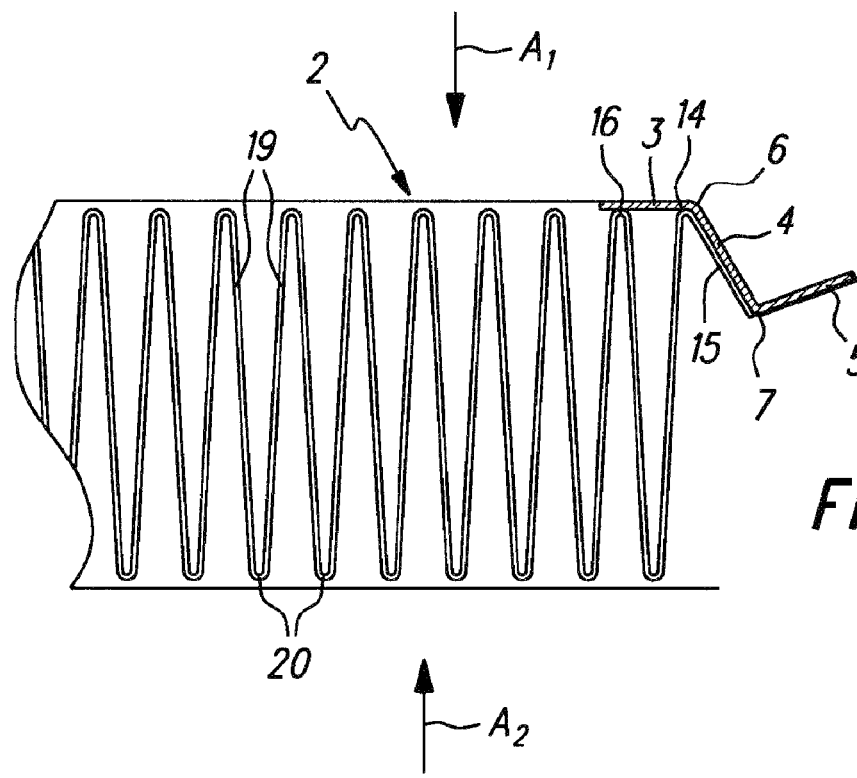
FIG. 9 is a detail view of a fold cross-section of the filter element showing a seventh variant of the terminal element.

In FIG. 9 another embodiment is illustrated wherein the fold end section 15 is shortened in comparison to the remaining fold sections 19 of the fold pack 2. The first leg 3 is resting on two folded edges 14, 16 of the fold pack 2 and the terminal fold 14 of the fold pack 2 which passes into the shortened fold end section 15 is positioned in the fold 6 between the first and second legs 3, 4. The second leg 4 and the shortened fold end section 15 are, for example, glued together and have the same width so that by means of the fold 7 a transition into the third leg 5 is realized.

The adhesive connection of the shortened fold end section 15 and the second leg 4 provides by means of the employed adhesive further stability and stiffness also with regard to the restoring force in the horizontal direction generated by the folds 6, 7 and 14 and therefore perpendicular to a possible flow direction A1, A2 of the air to be filtered or generally of the medium to be filtered. The embodiment illustrated in FIG. 9 is also particularly material-saving.

Figure 10:
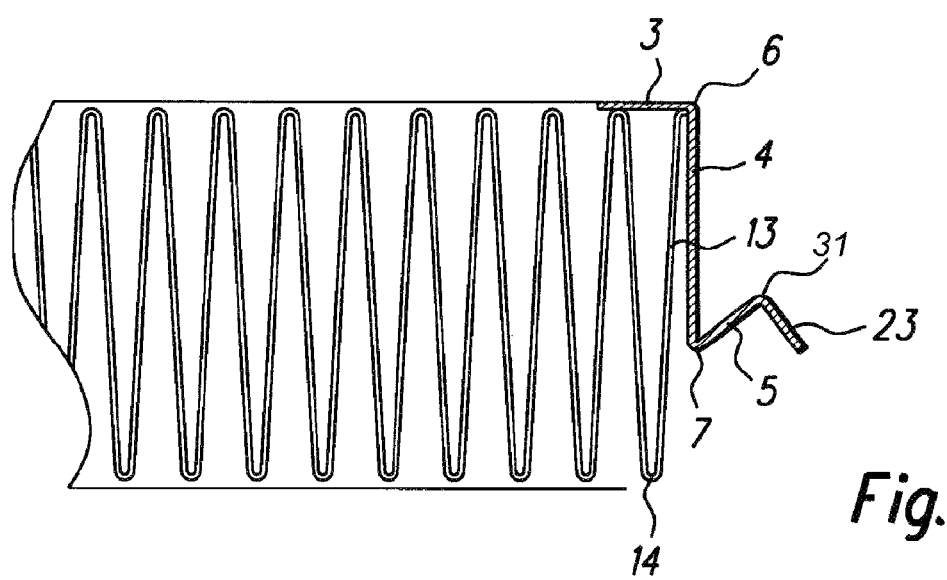
FIG. 10 is a detail view of a fold cross-section of the filter element showing an eighth variant of the terminal element.

Finally, a further embodiment of the filter element is illustrated in FIG. 10. It comprises essentially the same elements as explained in connection with the preceding FIGS. 3 to 9 and has an additional leg 23 that adjoins the third leg 5 by means of fold 31. By increasing the number of legs in particular in a direction adjoining the second leg 4 a further improved sealing action relative to a housing can be achieved because the additional folds 7, 31 provide additional restoring forces in the horizontal direction, i.e., in a direction perpendicular to the flow direction of the medium to be filtered.

Even though the present invention has been explained in detail with the aid of preferred embodiments, the invention is not limited to these embodiments but can be modified in many ways. The folding and gluing possibilities illustrated in the Figures as well as the width of the legs of the terminal element can be combined in many ways and are not limited to the explicitly illustrated configurations disclosed in the drawings. Moreover, all edges or parts of the periphery of a corresponding fold pack can be provided with such terminal elements.

The cross-sectional shape of the filter element illustrated in FIGS. 1 and 2 can also be modified so that semi-circular or irregular shapes are enabled depending on the requirements or design of the filter housing, respectively.

The specification incorporates by reference the entire disclosure of German priority document 20 2007 004 794.0 having a filing date of Mar. 30, 2007.

While specific embodiments of the invention have been shown and described in detail to illustrate the inventive principles, it will be understood that the invention may be embodied otherwise without departing from such principles.

What is claimed is:

1. A filter element comprising:
    a zigzag-shaped fold pack comprised of fold sections of filter media, said fold sections joined along adjacent edges by fold edges,
    wherein each fold edge loins together two adjacent filter media fold sections;
    at least one terminal element having:
        a second leg having opposing first and second edges, said second leg secured to a fold end section of said filter media fold pack,
        a first leg arranged parallel to the fold edges of the fold pack, said first leg joined to said first edge of said second leg by a first fold, said first leg not joined to any other legs, and
        a third leg joined to said second edge of said second leg by a second fold,
    wherein the first leg is arranged substantially perpendicularly to a flow direction of a medium flowing through the filter element,
    wherein said first and third legs are not arranged on opposing faces of one of said fold sections,
    wherein the first, second and third legs are substantially flat without folds,
    wherein said first, second and third legs form a continuous folded sheet,
    wherein at least one lateral web is attached unitarily to ends of several of the fold sections of the fold pack, the ends result from cutting the fold pack in a direction traverse to the folds,
    wherein the third leg projects laterally away from the filter element to form a peripheral seal.

2. The filter element according to claim 1, wherein the first and second legs are positioned at a right angle relative to one another.

3. The filter element according to claim 1, wherein
    the second fold of the at least one terminal element is folded opposite to the first fold and is located between the second leg and the third leg.

4. The filter element according to claim 1, wherein the at least one lateral web is made from a material having the same thickness or being thicker than the material of the at least one terminal element.

5. The filter element according to claim 1, wherein the first leg of the at least one terminal element rests on an edge of the at least one lateral web.

6. The filter element according to claim 1, wherein
    the filter element exclusively consists of the fold pack, two of the at least one lateral web, and two of the at least one terminal element and
    wherein said two lateral webs are glued onto ends of cut folds of said filter pack, and
    wherein said terminal elements are each glued to opposing end faces of said filter pack and glued to top edges of said lateral webs.

7. The filter element according to claim 1, wherein the first leg of the terminal element rests on a folded edge of the fold pack.

8. The filter element according to claim 1, wherein a fold end section of the fold pack and the second leg of the at least one terminal element define a non-vanishing angle.

9. The filter element according to claim 1, wherein
    said fold end section is a shortened fold end section of the fold pack and is shorter than a height of the filter element and
    wherein the shortened fold end section is glued to the second leg of the at least one terminal element.

10. The filter element according to claim 1, wherein the at least one terminal element has at least one further leg adjoining the third leg.

11. The filter element according to claim 1, wherein the at least one terminal element is of a unitary configuration.

12. The filter element according to claim 1, wherein the first and second folds delimiting the first, second, and third legs are generated by slotted folds provided in the material of the at least one terminal element.

13. The filter element according to claim 1 wherein a width of the second leg matches a height of the filter element.

14. The filter element according to claim 1, wherein
    the width of the second leg is less than the height of the filter element, and
    wherein a sum of the width of the second leg and of a width of the third leg matches a height of the filter element or is greater than the height of the filter element.

15. The filter element according to claim 1 for filtering air for the interior of a motor vehicle.

16. The filter element according to claim 1, wherein said third leg of said at least one terminal element is joined only to said second leg of said at least one terminal element.

* * * * *